J. G. Manlove,
Riding Saddle,
Nº 151, Patented Mar. 25, 1837.
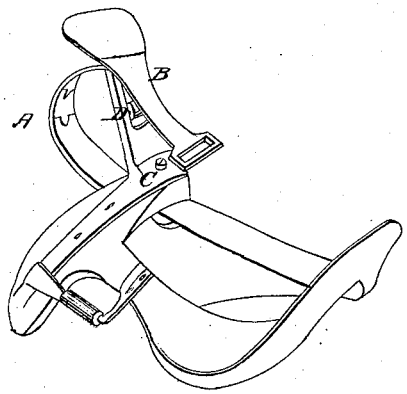

UNITED STATES PATENT OFFICE.

JOHN G. MANLOVE, OF BAINBRIDGE, OHIO.

SPRING-SADDLE.

Specification of Letters Patent No. 151, dated March 25, 1837.

*To all whom it may concern:*

Be it known that I, JOHN G. MANLOVE, of the town of Bainbridge, in the county of Ross and State of Ohio, have invented a new and useful Improvement in a Spring-Seat Saddle, and that the following is an exact description of the construction and operation as invented by me—to wit, a spring A, attached to the head of the tree by a screw C through the tree and gullet-plate; the spring from six to twelve inches long supported by from one to six stays to extend through an upright or horn B and to work on a brass roller D, to which the straining is attached, the spring from one-half to one inch wide and from one to three sixteenths of an inch thick; the upright or horn from three-quarters to one inch and a quarter wide and from two to six inches long attached to the head-plate of the tree, as per drawing herewith exhibited.

I claim as my improvement—

The combination of the spring with the horn or upright B and roller D substantially as above described.

JOHN G. MANLOVE.

Witnesses:
M. GILLFILLAN,
J. SHOOP.